United States Patent Office 3,453,291
Patented July 1, 1969

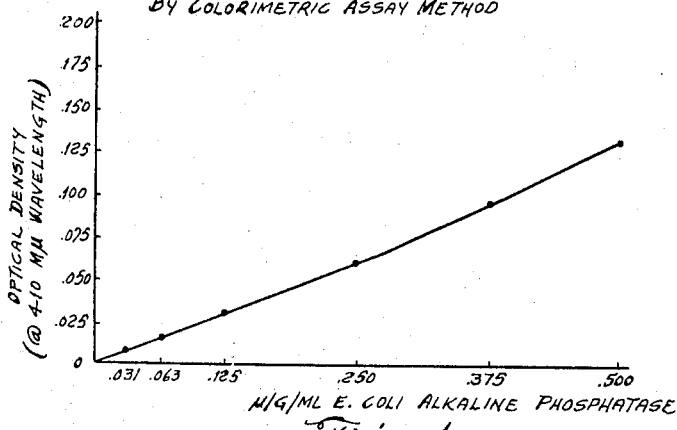
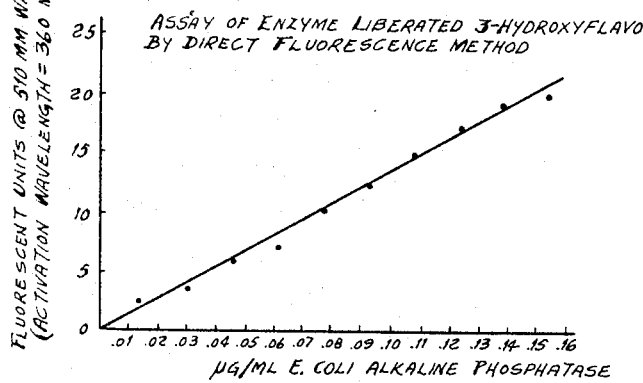
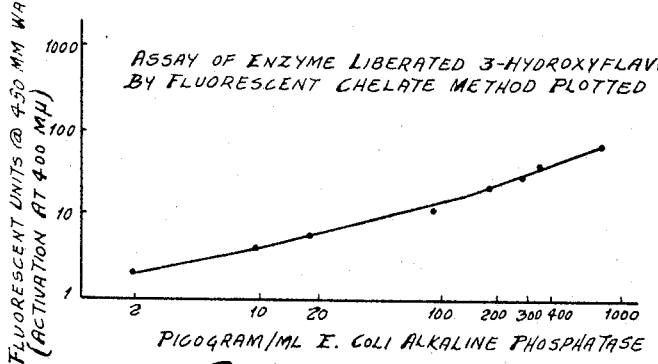

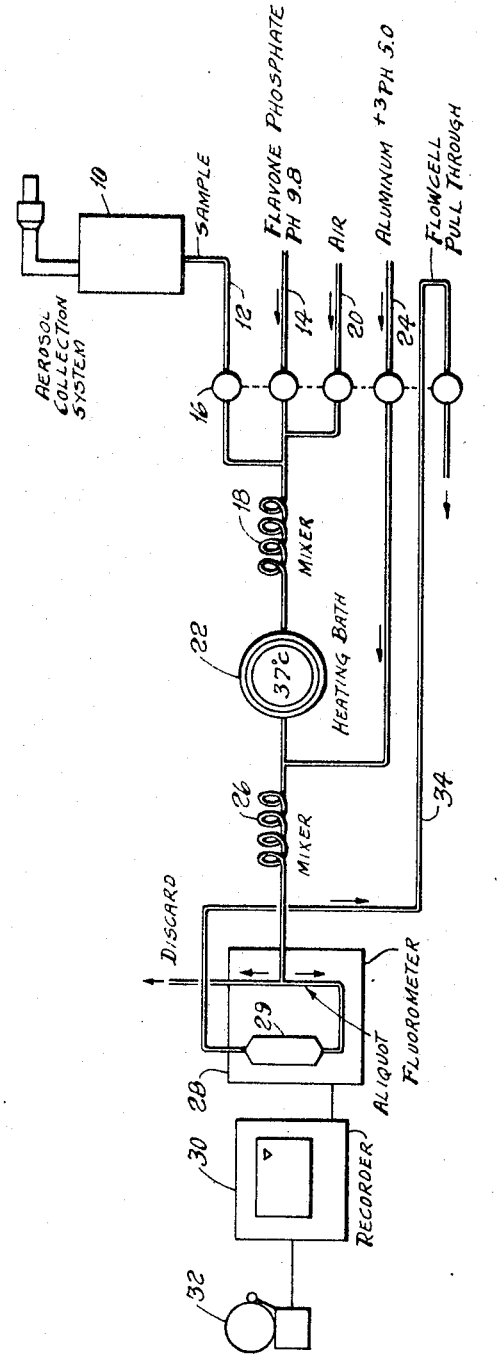

3,453,291
PHOSPHATE DERIVATIVES OF
3-HYDROXYFLAVONE
Eugene H. Jackim, Saunderstown, R.I., and David B. Land, Flushing, N.Y., assignors to the United States of America as represented by the Secretary of the Navy
Filed Jan. 26, 1967, Ser. No. 612,303
Int. Cl. C07d 7/18
U.S. Cl. 260—345.2          5 Claims

ABSTRACT OF THE DISCLOSURE

New synthesized compounds which are phosphate derivatives of 3 - hydroxyflavone useful as sensitive substrates for assaying phosphatase; enzymic cleavage of phosphate groups of the new compounds liberates 3-hydroxyflavone in proportion to enzyme concentration; and is assayable by direct absorption at 410 v. millimicron wavelength and more advantageously by ultra violet excitation for high sensitivity by forming the fluorescent metallic chelate of 3 - hydroxyflavone; continuous monitoring of the atmosphere for phosphatase using these rapidly responsive and extremely sensitive compounds in a fluorescent chelate technique for an indication of substantial change of airborne bacterial activity.

The invention described herein may be manufactured and used by or for the Government of the United States of America for governmental purposes without the payment of any royalties thereon or therefor.

BACKGROUND OF THE INVENTION (1) This invention relates to the chemistry of detection of bacteria and diseases. A common approach is to detect the presence of phosphatase and assay its concentration. Phosphatase, alkaline or acid, is present in substantially all living systems including bacteria. There has been continuing and growing need for improvement in the medical and biochemical fields, in the monitoring of food processes and in the monitoring of the level of airborne bacteria. More particularly, there has been a need for sensitive, rapidly responsive substrates that are reliable, stable, and easy to synthesize and employ.

(2) The sensitive fluorogenic phosphatase substrate 3-O-methylfluorescein phosphate known in the art does not have adequate stability in solution for automated applications.

Illustrative of the state of the art is U.S. Patent 2,-359,052 wherein there is disclosed a colorimetric phosphatolytic assay procedure employing several substrates and reagents. Current requirements include greater sensitivity and simplicity than can be achieved with the colorimetric method.

SUMMARY OF THE INVENTION

The invention concerns newly synthesized phosphate derivatives of 3-hydroxyflavone particularly the ammonium salt of flavone-3-diphosphate and flavone-3 monophosphate. These phosphate derivatives are stable, versatile, and when employed in a fluorometric chelate method are ultrasensitive for assaying both acid and alkaline phosphatase for all conventional purposes, e.g., medical applications, food process monitoring and atmosphere monitoring. The invention further concerns an automated phosphatase monitoring procedure for which the substrate or phosphate derivative in solution is used. The solution is stable. Enzymic cleavage of the phosphate groups liberates 3-hydroxyflavone which can be assayed colorimetrically, fluorometrically, or with ultrahigh sensitivity by forming the fluorescent metal chelate of 3-hydroxyflavone.

FIGS. 1–3 are graphical illustrations of sensitivity of flavone 3-diphosphate employed in colorimetric, fluorometric, and fluorometric chelate assay methods respectively, and FIG. 4 is a flow diagram of automated phosphatase assay system for atmospheric bacterial detection.

DESCRIPTION OF A PREFERRED EMBODIMENT

Synthesis of ammonium salt of flavone 3-diphosphate

A reaction mixture is prepared as follows: 1.2 grams of reagent-grade 3-hydroxyflavone is dissolved in 15 milliliters of dry tetrahydrofuran and the solution is added slowly at 20° C. to a solution of 0.7 milliliter of phosphorous oxychloride in 50 milliliters of dried benzene with mixing. Approximately 2.5 milliliters of triethylamine is added to the reaction mixture to change the pH of the reaction mixture to an apparent level of 6. After reaction time of 4–6 minutes, 50 milliliters of water is added to the mixture and sufficient ammonium hydroxide is added to raise the pH to 8. The solution is washed at least twice with 75 milliliters of a mixture of hexane and 1-butanol 4:1 by volume; after each wash the aqueous phase is retained and the organic phase including benzene, hexane and butanol and contaminants are discarded. An excess of isopropyl alcohol is added to the aqueous phase which precipitates a white gel-like material. The white substance is filtered on filter paper and dried at room temperature. The yellow contamination remains in the liquid and passes through the filter.

The white powder thus obtained has a melting point of 170–172 degrees centigrade, with decomposition at 160 degrees centigrade. Results of microanalysis and infrared examination indicated the structure as

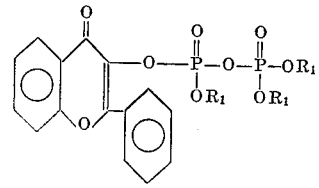

$R_1$ is an ammonium group or hydrogen which is consistent with the diphosphate structure. There are indications of minor equal amounts of mono and triphosphates. High purification is difficult by conventional methods. Chemical analysis provided the following data on composition:

C–31.9, H–5.4, P–13.0, N–9.1; theoretical composition of flavone 3-diphosphate is as follows: C–40.1, H–4.7, P–13.8, N–9.4.

The ammonium salt of flavone 3-diphosphate is obtained in high yields, namely, 90 percent of theoretical.

Consistent results were obtained. Dry tetrahydrofuron serves as a solvent for the 3-hydroxyflavone and does not enter into the reaction. Another solvent for 3-hydroxyflavone may be substituted. The relationship of 1.2 grams of 3-hydroxyflavone to 15 milliliters of tetrahydrofuran is not critical being representative of a near saturated solution. The quantity of phosphorous oxychloride is directly related to the quantity of 3-hydroxyflavone. The quantity of dry benzene, 50 milliliters, is selected to provide a dilute solution of the phosphorous oxychloride. It is important that both the solvents be dry for maximum yield. The solution of 3-hydroxyflavone is added slowly to avoid too vigorous a reaction. The temperature of the reactants is not critical and may be within at least 3 or 4 degrees either side of 20 degrees centigrade. Triethylamine serves as a strong organic base to complete the reaction. Another suitable strong base is pyridine. It has been observed that the reaction is essentially complete in about 4 minutes; up to 6 minutes is allowed for the reaction. The 50 milliliters of water then added is not critical; an amount of water which about doubles the volume is satisfactory. The ratio of hexane to 1-butanol is not critical and is employed in a conventional washing technique, wherein the washing solvent dissolves some of the impurities and then separates into an upper phase from which the lower or aqueous phase is separated and washed again.

The synthesized flavone 3-diphosphate is stable in the dry state and in solution and is adaptable to several assay methods.

ASSAY BY COLORIMETRIC METHOD

Flavone-3-diphosphate ammonium salt is an advantageous substrate for assaying alkaline phosphatase with a spectrophotometer set at 410 millimicrons. A change in optical density can be detected in a 0.005 milligram per milliliter substrate solution to which is added a very low concentration of phosphatase following which there is an incubation period of 5 minutes at 37 degrees centigrade. Concentrations of *Escherichia coli* alkaline phosphatase as low as 0.03 microgram per milliliter of substrate can be detected. The enzyme reaction proceeds at a constant rate in the presence of excess substrate. It was found that optical density is directly related to the concentration of alkaline phosphatase. The 5 minute period is arbitrary incubation time chosen for convenience. The reaction is carried out in a 0.05 M borate buffer solution at pH 9.8 which is optimum for enzyme activity. The reaction liberates 3-hydroxyflavone which can be assayed by direct absorption at 410 millimicron wavelength. The described method of colorimetric assay was carried out with the following enzyme concentrations:

| Micrograms per milliliter *E. coli* alkaline phosphatase | Optical density |
| --- | --- |
| .031 | .011 |
| .063 | .019 |
| .125 | .032 |
| .250 | .062 |
| .375 | .095 |
| .500 | .140 |

The linear relationship of this data is illustrated graphically in FIG. 1.

ASSAY BY DIRECT FLUORESCENT METHOD

A one milligram per milliliter solution of the ammonium salt of flavone-e diphosphate is mixed with 0.025 M glycine buffer pH 9.8 in the ratio 1:100 by volume. The enzyme is added and incubated for 5 minutes just as in the colorimetric method. A spectrophotofluorometer activates the sample at a wavelength of 360 millimicrons with the emission at a wavelength of 510 millimicrons. Borate buffer is not used in this method because it quenches the fluorescence of liberated 3-hydroxyflavone. Final fluorescence is increased 200-fold by addition of an equal volume of ethanol to the sample. This method was carried out at pH 9.8. Fluorescence measured at pH 9.8 is linear for dilute concentrations of enzyme up to 3 micrograms per milliliter. The data for the graph in FIG. 2 is as follows:

| Micrograms per milliliter *E. coli* alkaline phosphatase | Fluorescent units |
| --- | --- |
| .15 | 3 |
| .030 | 4 |
| .045 | 6 |
| .062 | 7 |
| .077 | 10 |
| .093 | 12 |
| .109 | 15 |
| .125 | 17 |
| .140 | 19 |
| .155 | 21 |

Sensitivity is slightly better with the direct fluorometric method than with the colorimetric method.

At pH 5.0, the fluorescence of the cleaved substrate is on the order of eight times greater than at pH 9.8; however, at the low pH fluorescence is not linear with concentration.

The fluorescence and optical density of 3-hydroxyflavone are not linear at high concentrations apparently due to the insolubility of the compound in aqueous solution.

ASSAY BY FLUORESCENT CHELATE METHOD

A small sample e.g., 20 microliters of a one milligram per milliliter solution of the ammonium salt of flavone 3-diphosphate is added to 0.5 milliliter of 0.025 M glycine buffer pH 9.8 in a cuvet. Various quantities of *E. coli* alkaline phosphatase ranging from as low as $10^{-12}$ grams were added to the buffered substrate solution. After the incubation period of 5 minutes at 37° C. the enzyme reaction mixture is treated with 2 milliliters of a mixture of 3 parts of 0.05 M acetic acid buffer, pH 5.0, and 2 parts 0.01 M aluminum chloride. Approximately two minutes are allowed for optimum chelate development. Using a spectrophotofluorometer, the mixture is activated at a wavelength of 400 millimicrons; maximum fluorescent emission occurs at 450 millimicrons. This method has proven to be extremely sensitive. Trace amounts of purified alkaline phosphatase were determined fluorometrically by formation of the fluorescent aluminum chelate from the cleaved substrate. For the determination of acid phosphatase this method is carried out at pH 5.0 at the same incubation temperature and incubation time as the alkaline phosphatase with equivalent results. The following data was obtained at pH 5.0—

| Picograms/M1 *E. coli* alkaline phosphatase: | Fluorescent units |
| --- | --- |
| 2 | 3 |
| 10 | 6 |
| 19 | 8 |
| 90 | 10 |
| 170 | 25 |
| 250 | 40 |
| 350 | 65 |
| 750 | 95 |

This data is plotted $\log_{10}$—$\log_{10}$ in FIG. 3.

In the fluorescent chelate method a large excess of aluminum to substrate is required for maximum fluorescence and to prevent competition from the liberated phosphate for the aluminum of the chelate. At low concentrations, the aluminum reacts with the ligand in a 1:3 molar ratio; however, at higher aluminum concentrations as in the phosphatase assay the system becomes complex. The fluorescence of the water soluble chelate is linear with concentration in dilute solution.

CYTOHISTOCHEMICAL APPLICATION

*Buccal epithelial* smears, and *Serratia marcescens*, *Bacillus subtilis* and *Rhizopus nigricans* culture smears were prepared on microscope slides. After drying the smears were bathed for 5 minutes with a 10 milligram per milliliter solution of flavone 3-diphosphate ammonium salt in either water or pH 9.8 borate buffer. The slides were observed under a fluorescent microscope using a KG 2, BG 12, and UG excitation filter combination and a GG 9 glass emission filter. From these cytohistochemical observations it was ascertained that the substrate flavone 3-diphosphate ammonium salt is active in both mammalian and bacterial cells. The cells fluoresce brightly with relatively low background.

DESCRIPTION OF ANOTHER PREFERRED EMBODIMENT

Synthesis of flavone 3-monophosphate

Dibenzyl chlorophosphonate is prepared as follows: Exactly 1.3 grams of dibenzyl phosphite is added to 0.67 gram of N-chlorosuccinimide in 15 milliliters of dry benzene with stirring for 10 minutes. The reaction mixture is allowed to stand at room temperature at approximately 20 degrees centigrade for 2 hours. The succinimide is filtered and the freshly prepared dibenzyl chlorophosphonate kept free from moisture. The phosphonate is added to 1.2 grams of 3-hydroxyflavone in 50 milliliters of dry benzene. A slight molar excess of triethylamine is added to the reaction mixture at 60 degrees centigrade and run for 2 hours. Triethylamine hydrochloride is removed by filtering the warm solution. The filtrate is evaporated to near dryness and extracted with 50 milliliters of ethanol. The ethanolic solution is hydrogenated with 50 percent platinum-palladium black at 50 degrees centigrade for 2–3 hours. The monophosphate is filtered out, dried, redissolved in hot water, and filtered while hot. Upon cooling the solution was extracted twice with benzene and a 1,4-butanolhexane mixture. After extraction, the aqueous phase was lyophilized and redissolved in 10 milliliters of distilled water. A 0.45 micron Millipore filter is used to separate the insoluble yellow impurity. The product, monophosphate, is lyophilized to a dry powder. For larger quantities proportionately larger amounts of the material are processed in the same manner. The monophosphate was identified by essentially the same procedures as the diphosphate. Chemical analysis provide the following data on composition:

C–57.1, H–3.6, P–9.7; theoretical composition flavone-3 monophosphate ammonium salt is C–56.6, H–3.8, P–9.7.

Results of microanalysis indicate the structure as

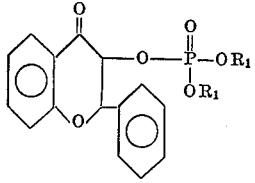

where $R_1$=ammonium group or hydrogen which is consistent with the monophosphate structure. However, the monophosphate was obtained in yields of only 10 percent of theoretical. Therefore, the diphosphate has several advantages over the monophosphate among which are ease of synthesis and high yield; however, sensitivity and stability in solution are comparable.

An automated system for monitoring the phosphatase in the atmosphere for atmospheric bacterial detection, shown schematically as a flow diagram in FIG. 4, includes an aerosol collection equipment 10 known in the in the art and obtainable commercially. Basically, the equipment 10 includes a vacuum pump for forcing air at a high c.f.m. rate therethrough. A reservoir of water is contained in the equipment. Airborne solids are separated from the air. A fresh water feed provides for continuous water exchange in the equipment at a selected rate to preclude progressive accumulation of contaminants. A continuous concentrated sample is delivered to pliable tubing 12. Another pliable tubing 14 extends from a reservoir of the substrate, i.e., a solution of flavone 3-diphosphate ammonium salt pH 9.8. A proportional pump represented symbolically at 16 and having five coupled together pumping assemblies for engaging a corresponding number of pliable tubes discontinuously forces the reactants contained in selected length of the tubes to coiled mixing tube 18. A pliable tube 20 supplies the air for separating consecutive mixtures of the reactants into a series of specimens. Proportions of reactants is determined by choice of diameters of tubes 12, 14, and 20. The tubing carrying the specimens extends through a heating bath for incubation and is of the proper length for the selected incubation time. A pliable tubing 24 controlled by the pump 16 delivers the metal chelating agent solution at the selected rate. After passage through mixer coil 26 an aliquot of the series of specimens are delivered to reservoir 29 in the fluorometer. The remainder, e.g., 75% is discarded. The aliquot is illustrated at the prescribed wavelength. An X–Y recorder 30 continuously registers the fluorescence intensity. An alarm 32 is provided to draw attention to change beyond selected limits. A return tube 34 extends from the reservoir 29 to the pump.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:

1. A phosphate derivative of 3-hydroxyflavone selected from the group consisting of (a) the monophosphate having the formula

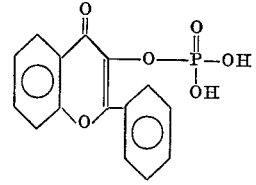

(b) the monophosphate having the formula

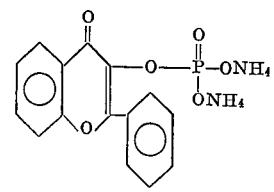

(c) the diphosphate having the formula

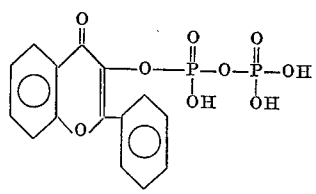

and (d) the diphosphate having the formula

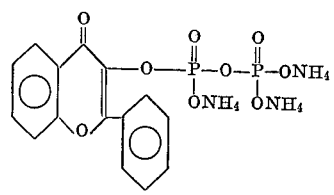

2. The phosphate derivative defined in claim 1 consisting of
the monophosphate

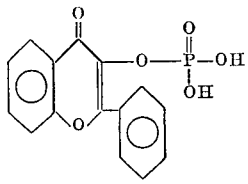

3. The phosphate derivative defined in claim 1 consisting of
the monophosphate

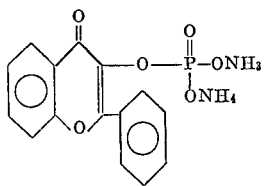

4. The phosphate compound defined in claim 1 consisting of

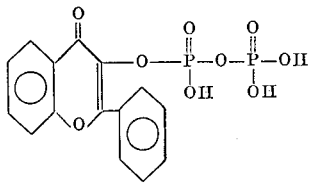

5. The phosphate derivative defined in claim 1 consisting of
the diphosphate

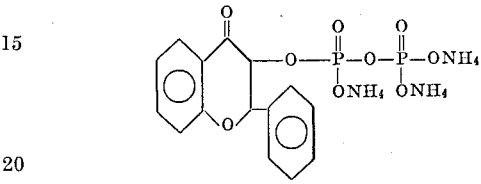

References Cited
UNITED STATES PATENTS 2,457,932   1/1949   Solmssen et al. _____ 260—345.5
3,160,638   12/1964   Folkers et al. _____ 260—345.5

HENRY R. JILES, *Primary Examiner.*

JOHN M. FORD, *Assistant Examiner.*

U.S. Cl. X.R.

260—999